April 28, 1964

F. R. BRADLEY, JR 3,131,381

HALL-EFFECT MEMORY DEVICE

Filed June 1, 1962

INVENTOR.
FRANK R. BRADLEY, Jr.

BY

Dean, Fairbank & Hirsch
ATTORNEYS 3,131,381
Patented Apr. 28, 1964

3,131,381

HALL-EFFECT MEMORY DEVICE

Frank R. Bradley, Jr., 9 Dash Place, New York, N.Y.
Filed June 1, 1962, Ser. No. 199,463
10 Claims. (Cl. 340—174)

This invention relates to memory devices, more particularly of the type employing a Hall generator.

According to the invention the equipment utilizes the property of certain materials such as indium antimonide to provide an electric potential, known as the "Hall Voltage," between laterally spaced points along one axis of a strip of such material when a control current is flowing longitudinally of the material when the plane of the strip is perpendicular to a magnetic field. The electric property of these materials has become known as the "Hall effect" and devices which utilize materials having this property are customarily called "Hall effect devices."

The output voltage produced by a conventional Hall effect device or Hall generator is generally proportional to the product of the magnetic field strength and the intensity of the current passed through a Hall effect element called the "Hall plate." The term "Hall plate" is used in this specification and claims to define a thin metal plate of substantial "Hall effect coefficient" having a pair of spaced input electrodes connected to supply current through the plate between the input electrodes and having a pair of output electrodes connected to the plate on opposite sides of the input current path. The absolute magnitude of this Hall effect output voltage for a given magnitude field and a given input Hall plate current is dependent upon the composition and dimensions of the Hall plate. The output voltage in such conventional device varies with variations in either the magnetic field, which is called the control field, or the input Hall plate current which is called the control current.

Memory devices are useful in various applications, one such application being the use of memory devices to store information in computers until the information is required for various mathematical computations.

An object of the present invention is to utilize a Hall generator as a memory device.

Another object is to provide a memory device having high sensitivity, rapid setting speed and high output current.

These and other objects and advantages of the invention are accomplished in a typical embodiment by changing the value of the Hall-generator field so that the Hall output signal is proportional to the signal to be remembered.

In the accompanying drawings in which is shown one or more of various possible embodiments of several features of the invention, FIG. 1 is a schematic diagram showing a basic embodiment of the invention;

Figure 1:
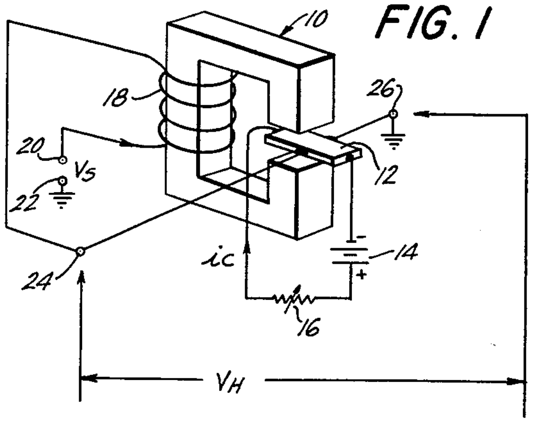

Referring now to the drawings, in FIG. 1, the Hall generator comprises a magnet 10, which, for example, may be a permanent magnet, a Hall plate 12 and means for sending a control current, $i_c$, longitudinally through said Hall plate 12. The control-current means may, for example, comprise a source of D.-C. voltage 14 and a variable resistor 16 for adjusting the magnitude of the control current. A coil 18 is wound around a leg of the magnet 10. Terminals 20 and 22 are connected, respectively, to one end of said coil 18 and to a reference potential, illustratively ground. The other end of the coil 18 is connected to a terminal 24 which, in turn, is connected to one of the longitudinal side electrodes of the Hall plate 12. The other longitudinal side electrode of the plate 12 is connected to a terminal 26 which is also connected to a reference potential such as ground.

In operation, the signal to be remembered, $V_S$, is applied between terminals 20 and 22. The resulting current through the coil 18 changes the state of magnetization of the magnet 10. A Hall output voltage $V_H$, appears between the terminals 24 and 26. The Hall output voltage, $V_H$, the signal voltage, $V_S$, and the coil 18 are in series between the ground terminals 22 and 26, the Hall voltage sending a current through the coil 18 in opposition to the current generated by the signal voltage. As the magnetization changes, the Hall output voltage changes until it is equal to the signal voltage and current then ceases to flow in the coil 18. The signal voltage $V_S$, can now be removed and its value can be read out at some future time between the Hall-voltage terminals 24 and 26.

The control current, $i_c$, is kept at a constant value between the time of setting (time at which the signal voltage is applied) and the time of readout, in order to maintain the remembered voltage at the exact value of the signal voltage. However, an advantageous feature of this invention is that scaling (multiplication by some factor) of the remembered voltage may easily be effected by a simple variation of the control current, for example, by means of the adjustable resistor 16 or changing the value of the voltage from battery 14.

It is also feasible to convert the remembered voltage to a proportional A.C. value by changing the voltage source 14 to an A.C. source after the D.C. signal has been remembered.

Figure 2:
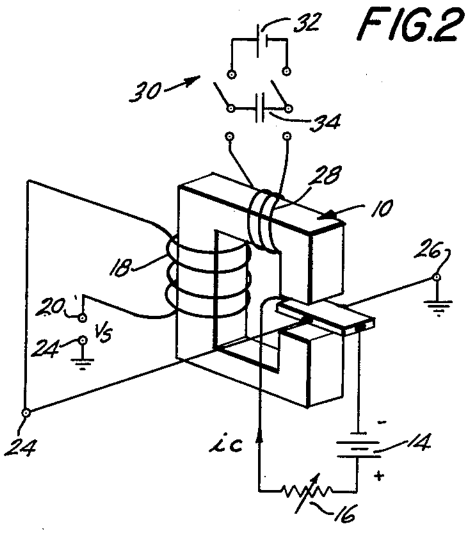
FIG. 2 is a schematic diagram of a refinement of the embodiment shown in FIG. 1.

FIGURE 2 illustrates a refinement of the basic embodiment of the invention. It has been found that a magnetic striction effect limits the resolution of the memory device, i.e., limits its sensitivity to small changes in the memory voltage. The magnetic striction effect can be overcome or erased by superimposing a low amplitude, high frequency oscillation on the magnetic field of the Hall generator. Accordingly, a coil 28 is connected to one pair of terminals of a double-pole, double-throw switch 30 and a source of D.-C. voltage 32 is connected to the other pair of terminals of the switch 30. A condenser 34 is connected between the poles of the switch 30.

The condenser 34 is charged by connecting it to the D.-C. source 32. At the setting, or reading time when the signal voltage, $V_S$, is applied, the poles of the switch 30 are thrown over to connect the condenser 34 across the coil 28 to form an oscillatory tank circuit, which superimposes a damped oscillation on the field of the magnet 10. The coil 10 may, if desired, serve as the inductive element of the oscillatory tank circuit. Also, the initial charge on the condenser may be supplied by a pulse of energy at the setting time, with the condenser being permanently connected to the coil of the tank circuit.

The oscillation may alternatively be supplied by a high-frequency generator.

Figures 3, 4, 5:
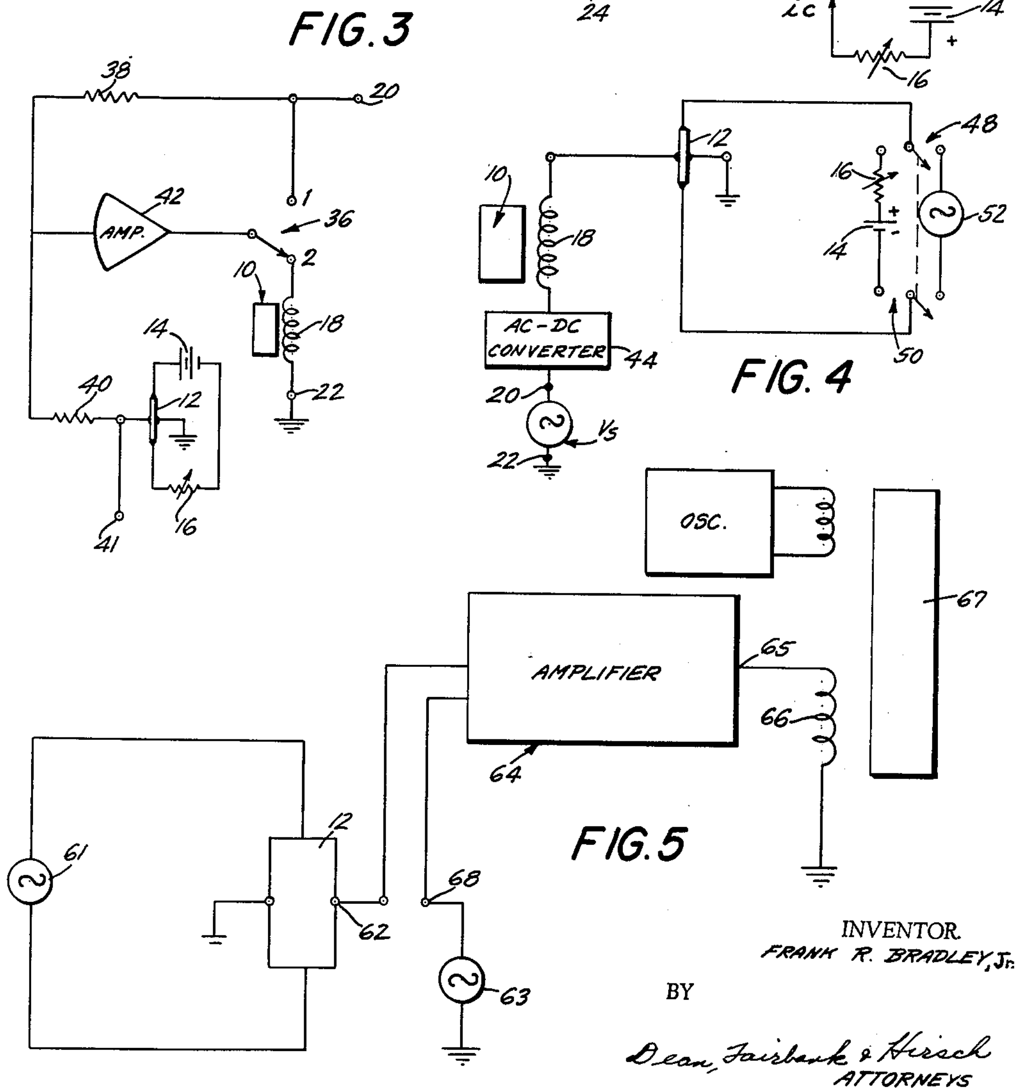
FIG. 3 illustrates the use of the invention with an amplifier.
FIG. 4 illustrates an embodiment adapted for A.-C. signals.
FIG. 5 is another embodiment of the invention.

For greater speed and accuracy in setting and/or for high output current, it is desirable to introduce amplification into the memory device. FIGURE 3 shows a typical circuit incorporating a D.-C. operational amplifier 42. With single-pole, double-throw switch 36 in position 2, the signal voltage, $V_S$, is applied between terminals 20 and 22. The signal voltage through resistor 38 and the Hall voltage through resistor 40 are applied in opposition to amplifier 42. The resultant signal applied to the input of the D.-C. amplifier 42 is the difference between the Hall and the signal voltages. This differential voltage drives a current through the magnetizing coil 18 until the Hall voltage equals the signal voltage. When the switch 36 is thrown to position 1, the memory voltage, which in this circuit is an amplified version of the final value of the Hall voltage, may be read out between terminals 20 and 22.

The circuit shown in FIG. 3 provides high accuracy by minimizing error due to the various circuit components. It accomplishes this in the following ways:

(*a*) It uses the same resistor pair in inverse fashion to memorize and to read out, thereby eliminating resistor error;

(*b*) It uses the same amplifier to memorize and to read out, thereby cancelling drift error, and (*c*) Scaling and offset errors in setting are opposite to those in readout and therefore cancel each other.

A further advantage of this circuit is that if resistor 38 equals resistor 40 in magnitude, the memory voltage may be read out with opposite signs at terminals 20 and 41.

FIGURE 4 illustrates an embodiment which may be employed as an A.-C. memory device. The signal voltage, $V_S$, may be an A.-C. voltage which is converted to a corresponding D.-C. voltage by an A.-C. to D.-C. converter 44. A pair of ganged single-pole, double-throw switches 48 and 50 are employed to permit the use of a D.-C. control current during read-in and an A.-C. control current from an A.-C. supply source 52 during readout.

FIGURE 5 illustrates another embodiment which may be employed as an A.-C. memory device in which the Hall control current is furnished by an A.-C. source 61. The A.-C. difference between the Hall output voltage appearing at terminal 62 and the signal voltage 63 is A.-C. amplified by differential amplifier 64 which includes a demodulator of conventional type to furnish a D.-C. output at terminal 65 to drive the coil 66 of the control magnet 67 so that voltage from terminals 62 and 68 will become equal. Then the remembered voltage equal to the signal voltage will appear at terminal 62.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A memory device comprising in combination, Hall-generator means including a Hall plate having Hall voltage output terminals and means for generating a magnetic field, magnetizing means arranged to modify such magnetic field, means for applying an input signal to said magnetizing means, means for applying such Hall voltage output to said magnetizing means in direction to oppose the input signal to the Hall-generator and provide a difference signal therefrom, said difference signal being applied to drive said magnetizing means for modification of such magnetic field, and connection means for deriving the Hall-generator voltage as an output signal.

2. The combination as set forth in claim 1 which further includes amplification means to amplify the different signal.

3. A device as set forth in claim 1, further including high-frequency oscillatory means electrically associated with said magnetic-field-generating means of said Hall-generator for superimposing a high frequency magnetic field upon the field of said magnetic-field-generating means.

4. A device as set forth in claim 1, further including high-frequency oscillatory means electrically associated with said magnetic-field-generating means of said Hall-generator for superimposing a high frequency magnetic field upon the field of said magnetic-field-generating means, and further including amplification means to amplify the different signal.

5. A memory device comprising in combination, Hall-generator means including a Hall plate, a magnetic-field-generating means, magnetizing means arranged to affect the strength of the field produced by said magnetic-field-generating means, and connection means for applying a signal voltage, said connection means being arranged in series with said magnetizing means and the Hall voltage output of said Hall-generator means, the polarities of connection being such as to oppose the Hall voltage to the signal voltage.

6. A device as set forth in claim 5, further including means for converting an A.C. to a D.C. signal, said converter means being inserted between said connection means and said magnetizing means.

7. A memory device comprising in combination, a Hall-generator including a magnet and a Hall plate having Hall output voltage electrodes, a magnetizing coil wound around a leg of said magnet, and connections for a signal voltage, said signal voltage connections being connected in a series circuit with said magnetizing coil and said Hall-voltage electrodes, the Hall voltage direction being such as to oppose the flow of magnetizing current generated by the signal voltage.

8. A device as set forth in claim 7, further including oscillatory means for generating a low-power, high-frequency magnetic field and superimposing said oscillatory magnetic field upon the field of said Hall-generator magnet.

9. A device as set forth in claim 7, further including an A.C. to D.C. converter, said converter being connected between said connections for a signal voltage and said magnetizing coil.

10. A memory device comprising, in combination, Hall-generator means comprising a Hall plate having a pair of control-current electrodes and a pair of Hall-voltage electrodes, magnetic-field-generating means, control-current-generating means connected to said control-current electrodes, magnetic-field modifying means, a pair of resistors, a pair of terminal junctions, one being connected to ground, one of said Hall-voltage electrodes also being connected to ground, said resistors being connected in series between the other of said terminal junctions and the other of said Hall-voltage electrodes, D.C. amplifier means having its input connected to the junction between said series resistors, and a single-pole, double-throw switch having its pole connected to the output of said amplifier means, one of the switch terminals being connected to said other of said terminal junctions, and the other switch terminal being connected to said magnetic field modifying means, the current through the magnetic field modifying means being produced by the difference in voltage between the Hall-generator output and an input signal applied to said other of said terminal junctions.

No references cited.